US011976148B2

(12) United States Patent
Volp et al.

(10) Patent No.: US 11,976,148 B2
(45) Date of Patent: May 7, 2024

(54) ACRYLIC-EPOXY ADHESIVE COMPOSITION

(71) Applicant: 3M INNOVATIVE PROPERTIES COMPANY, St. Paul, MN (US)

(72) Inventors: Kelly A. Volp, Minneapolis, MN (US); Kathleen S. Shafer, Woodbury, MN (US); Peter O. Rekow, Woodbury, MN (US); Jonathan E. Janoski, Woodbury, MN (US); Thomas Q. Chastek, St. Paul, MN (US); Bradford L. Ryland, Minneapolis, MN (US); Douglas L. Elmore, Plymouth, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 653 days.

(21) Appl. No.: 17/059,739

(22) PCT Filed: May 30, 2019

(86) PCT No.: PCT/IB2019/054487
§ 371 (c)(1),
(2) Date: Nov. 30, 2020

(87) PCT Pub. No.: WO2019/229695
PCT Pub. Date: Dec. 5, 2019

(65) Prior Publication Data
US 2021/0206897 A1    Jul. 8, 2021

Related U.S. Application Data

(60) Provisional application No. 62/679,052, filed on Jun. 1, 2018.

(51) Int. Cl.
| | |
|---|---|
| *C08F 220/28* | (2006.01) |
| *C08F 2/50* | (2006.01) |
| *C08F 220/18* | (2006.01) |
| *C08F 220/20* | (2006.01) |
| *C08K 5/00* | (2006.01) |
| *C08K 9/02* | (2006.01) |
| *C08L 29/14* | (2006.01) |
| *C08L 63/00* | (2006.01) |
| *C08L 71/02* | (2006.01) |
| *C09J 7/30* | (2018.01) |

(52) U.S. Cl.
CPC ............ *C08F 220/281* (2020.02); *C08F 2/50* (2013.01); *C08F 220/1804* (2020.02); *C08F 220/1811* (2020.02); *C08F 220/20* (2013.01); *C08K 5/0041* (2013.01); *C08K 9/02* (2013.01); *C08L 29/14* (2013.01); *C08L 63/00* (2013.01); *C08L 71/02* (2013.01); *C09J 7/30* (2018.01); C08L 2205/025 (2013.01); C08L 2205/035 (2013.01); C08L 2205/18 (2013.01); C09J 2301/208 (2020.08); C09J 2431/00 (2013.01); C09J 2433/00 (2013.01); *C09J 2463/00* (2013.01); *C09J 2471/00* (2013.01)

(58) Field of Classification Search
CPC ............ C08F 220/281; C08F 220/1804; C08F 220/1811; C08F 220/20; C08F 2/50; C08K 5/0041; C08K 9/02; C08L 29/14; C08L 63/00; C08L 71/02; C08L 2205/025; C08L 2205/035; C08L 2205/18; C09J 2301/208; C09J 2431/00; C09J 2433/00; C09J 2463/00; C09J 2471/00; C09J 2301/412; C09J 7/10
See application file for complete search history.

(56) References Cited

U.S. PATENT DOCUMENTS

| | | | |
|---|---|---|---|
| 4,619,979 A | 10/1986 | Kotnour | |
| 4,722,943 A | 2/1988 | Melber | |
| 4,843,134 A | 6/1989 | Kotnour | |
| 5,011,682 A | 4/1991 | Elliott | |
| 5,112,657 A | 5/1992 | Melber | |
| 5,180,752 A | 1/1993 | Melber | |
| 5,342,689 A | 8/1994 | Melber | |
| 5,637,646 A | 6/1997 | Ellis | |
| 5,658,969 A | 8/1997 | Gerace | |
| 5,804,610 A | 9/1998 | Hamer | |
| 6,579,588 B2 | 6/2003 | Wald | |
| 6,797,371 B1 | 9/2004 | Gehlsen | |
| 7,491,434 B2 | 2/2009 | Khandpur | |
| 7,879,441 B2 | 2/2011 | Gehlsen | |
| 11,034,866 B2* | 6/2021 | Anderson | ............... B32B 23/22 |
| 2010/0155325 A1 | 6/2010 | Zhang | |
| 2012/0034407 A1* | 2/2012 | Yamanaka | .................. C09J 7/29 |
| | | | 428/40.2 |

(Continued)

FOREIGN PATENT DOCUMENTS

| | | | | |
|---|---|---|---|---|
| CN | 108912384 A | * | 11/2018 | ............ C08F 220/06 |
| EP | 0839887 | | 5/1998 | |

(Continued)

OTHER PUBLICATIONS

Translation of CN-108912384-A (Year: 2018).*
Encyclopedia of Polymer Science and Technology, 322-382 (1986).
International Search Report for PCT International Application No. PCT/IB2019/054487, dated Sep. 18, 2019, 5 pages.

(Continued)

*Primary Examiner* — Scott R. Walshon

(57) ABSTRACT

A curable composition comprising: a hydroxy-functional or ether-functional (meth)acrylate copolymer, an epoxy resin; water; a photocatalyst, and optionally a polyvinyl acetal polymer and/or a film-forming polymer. When cured, provides structural bonding adhesives that are curable under high humidity conditions.

18 Claims, No Drawings

(56) References Cited

U.S. PATENT DOCUMENTS

2013/0029147 A1   1/2013  Miki et al.
2013/0034407 A1   2/2013  Hohmann et al.
2016/0289440 A1  10/2016  Janoski

FOREIGN PATENT DOCUMENTS

| | | |
|---|---|---|
| EP | 2551102 | 1/2013 |
| WO | WO1996-07522 | 3/1996 |
| WO | 98/50480 A1 | 11/1998 |
| WO | 2016/196561 A1 | 12/2016 |
| WO | WO2016-195970 | 12/2016 |
| WO | WO2017-205444 | 11/2017 |
| WO | WO2018-102198 | 6/2018 |

OTHER PUBLICATIONS

Handbook of Epoxy Resins by Lee and Nevill, McGraw-Hill Book Co., New York (1967), 51 pages.

* cited by examiner

ACRYLIC-EPOXY ADHESIVE COMPOSITION

CROSS REFERENCE TO RELATED APPLICATIONS

This application is a national stage filing under 35 U.S.C. 371 of PCT/IB2019/054487 filed May 30, 2019, which claims the benefit of Application No. U.S. 62/679,052, filed Jun. 1, 2018, the disclosure of which is incorporated by reference in its/their entirety herein.

FIELD OF THE INVENTION

The present invention is directed to structural and semistructural bonding adhesive articles, and methods for preparing the adhesive and articles. The present invention is further directed to articles of manufacture containing one or more components bonded together with structural bonding adhesive.

BACKGROUND

Structural bonding tapes are useful for bonding one or more substrates to one another. Many structural bonding tapes fall into one of two groups: (1) heat-curable structural bonding tapes, and (2) ultraviolet (UV) light-activatable structural bonding tapes. As suggested by the class name, heat-curable structural bonding tapes require heat to cure the adhesive composition of the tape. The UVi structural bonding tapes contain an adhesive composition that will begin to cure when exposed to UV light, but does not require heat for curing. Heat may be used to accelerate the rate of cure for UVi structural bonding tapes.

Typically, a length of structural bonding tape or a die cut piece of tape is removed from a roll, and attached to a first substrate using finger pressure. In the case of UVi structural bonding tapes, the structural bonding tape can be exposed to actinic radiation, such as UV. Then, a second substrate is brought into contact with the exposed surface of the structural bonding tape, and pressure is applied to the substrates for a period of time. Heat-curable structural bonding tapes, and optionally UVi structural bonding tapes, are then exposed to heat and the assembly is then allowed to cool. The result is a bonded article.

In addition, many current structural adhesive compositions require heat to cure the adhesive composition. In a process of making bonded articles, the bonded article must be subjected to a heating step in order to cure the adhesive composition as well as a cooling step in order to allow for further handling and/or packaging of the bonded article. From a processing standpoint, a process of making bonded articles without a heating step would be highly desirable.

In most applications, the structural or semi-structural bond is designed to be permanent. As a result, efforts to separate the substrates are often unsuccessful and result in substrate damage. In addition, the cured adhesive composition exhibits unpredictable cohesive and adhesive failure at either substrate.

There are applications, however, in which it would be preferable for the adhesive composition to exhibit high performance bond properties during use (i.e., the period and environmental conditions, e.g., temperature range, over which the adhesive composition performs as a semi-structural adhesive), yet be removable after use, or to permit a joint between substrates to be re-worked. A tension exists between these opposing performance criteria. In many industries, articles are bonded to substrates using structural and semi-structural adhesives. Over time the articles and/or substrates may require replacement, or the joint to the substrate inspected for wear. It would be preferable if these articles could be removed, reworked and/or replaced with new articles.

What is needed in the art is an adhesive article which has bonding performance and/or may be used to bond different substrates having different coefficients of thermal expansion and different physical and/or chemical surface characteristics. In addition, what is needed in the art is a UVi structural bonding tape, which allows the tape to be light-activatable from one side of the tape. What is needed in the art is a bonding tape that may be cured under extremes of heat and humidity without loss of performance. What is needed is an adhesive article that allows for the bonded surfaces to be separated as desired.

SUMMARY

The present disclosure addresses some of the difficulties and problems discussed above by the discovery of a novel adhesive article with exceptional adhesion properties. The structural bonding adhesive article possesses desired strength and adhesion properties. The adhesive of the article is light-activated (i.e. cure is initiated upon exposure to a light source), does not require heat for curing, and may be cured under conditions of high humidity. The structural bonding adhesive article may be used in a number of applications, in particular, as an adhesive for bonding together one or more substrates, and which permits the separation of the bonded surfaces without damage to allow rework as desired.

"Semi-structural adhesives" are those cured adhesives that have an overlap shear strength of at least about 0.75 MPa, more preferably at least about 1.0 MPa, and most preferably at least about 1.5 MPa. Those cured adhesives having a particularly high overlap shear strength, however, are referred to as structural adhesives. Structural adhesives are those cured adhesives that have an overlap shear strength of at least about 3.5 MPa, more preferably at least about 5 MPa. and most preferably at least about 7 MPa.

The present invention describes a curable pressure sensitive adhesive article that upon curing provides a semi-structural or structural adhesive. The adhesive article comprises at least one frangible voided adhesive layer and optionally at least one non-voided (e.g. film) adhesive layer. "Foam" or "voided" refers to the construction in which a very low density gas phase, microsphere or bubble is dispersed in a continuous polymer matrix. The voids may be preferably introduced by addition of expanded microspheres.

The adhesive articles permit selective adhesive failure by allowing two surfaces to be essentially inseparable at use, yet readily separable upon applying a shear force such that the voided adhesive layer undergoes selective cohesive failure. This feature is useful in bonding applications because it allows for the removal of the article without damage to the bonding surfaces. The adhesive article selectively fails by cohesive failure of the voided layer. In addition, the voided layer allows conformability in bonding substrates having different physical and chemical characteristics.

In some embodiments this disclosure provides a curable composition comprising:
- a) a mixture comprising a1) a hydroxy-functional or ether-functional (meth)acrylate monomer and a2) a (meth)acrylate ester monomer, or as a monomer mixture of syrup copolymer.
- b) an epoxy resin;
- c) a polyether polyol;
- d) optionally a hydroxy-functional film-forming polymer;
- e) water; and
- f) a photocatalyst, and
- g) optionally a polyvinyl acetal polymer
- h) a sufficient quantity of polymeric microspheres to yield a density reduction of >10% in the cured composition, said microspheres having a neutral surface;
- i) optionally a multifunctional acrylate and radical photoinitiator.

This partially cured composition will further comprise sufficient quantity of expanded polymeric microspheres to yield a density reduction of >10% in the cured composition, said microspheres having a neutral surface. The addition of the microspheres will yield a cured adhesive containing the requisite voids, providing a frangible layer that will selectively fail cohesively in a predictable manner.

The above composition including a) to g) may first be free-radically polymerized to a to a curable composition comprising:
- a) a hydroxy-functional or ether-functional (meth)acrylate copolymer;
- b) an epoxy resin;
- c) a polyether polyol;
- d) optionally a hydroxy-functional film-forming polymer;
- e) water; and
- f) a photocatalyst
- g) optionally a polyvinyl acetal polymer
- h) a sufficient quantity of polymeric microspheres to yield a density reduction of >10% in the cured composition, said microspheres having a neutral surface;
- i) optionally a multifunctional acrylate and radical photoinitiator.

This composition may be further polymerized by photolysis of the photocatalyst to cure the epoxy resin and provide a voided adhesive layer.

These compositions will further comprise a sufficient quantity of expanded polymeric microspheres to yield a density reduction of >10% in the cured composition, said microspheres having a neutral surface. This composition may be further polymerized by photolysis of the photocatalyst to cure the epoxy resin and provide a voided adhesive layer. The result of the second curing stage may be descried as voided composition comprising continuous (meth)acrylate copolymer and epoxy polymer continuous phases and a discontinuous phase of expanded polymeric microspheres. The two polymeric phases may be co-continuous and there may be some degree of crosslinking between the two phases.

DETAILED DESCRIPTION

The adhesive composition of the voided (foamed) adhesive layer comprises, in part, a (meth)acrylate copolymer having pendent hydroxyl-functional or ether-functional groups. The copolymer is derived from hydroxyl-functional or ether-functional monomer units. In some embodiments, the copolymer is derived from monomer units of the formula:

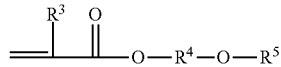

where
$R^3$ is —H—, or $C_1$-$C_4$ alkyl; and
$R^4$ is aryl or a linear or branched $C_2$-$C_{10}$ alkylene, and
$R^5$ is H, aryl or a linear or branched $C_1$-$C_4$ alkyl.
$R^4$ and R may be taken together to form a cyclic ether.
Preferably the sum of the carbon atoms of the $R^4$ and $R^5$ groups is from 3 to 10, preferably 3 to 6.

In some embodiments the voided (foamed) adhesive layer comprises, in part, a (meth)acrylate copolymer derived from monomer having pendent ether-functional groups of the formula:

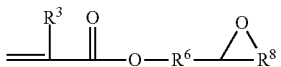

wherein
$R^3$ is —H or $C_1$-$C_4$ alkyl; and
$R^6$ is a linear or branched $C_1$-$C_{10}$ alkylene,
$R^8$ is a $C_2$-$C_{10}$ alkylene.

In some preferred embodiments the voided (foamed) adhesive layer comprises a tetrahydrofurfuryl (meth)acrylate (THFA) copolymer component. Unless otherwise specified, the TI-FA acrylates and methacrylates will be abbreviated as THFA. More particularly, the adhesive composition comprises a copolymer of tetrahydrofurfuryl (meth)acrylate, a $C_1$-$C_8$ (meth)acrylate ester and an optional cationically reactive functional (meth)acrylate.

In addition to the hydroxy- or ether functional monomer units, the copolymer further comprises a $C_1$-$C_8$ alkyl (meth)acrylate ester monomer. Useful monomers include the acrylates and methacrylate of methyl, ethyl, propyl, isopropyl, butyl, pentyl, hexyl, heptyl and octyl alcohols, including all isomers, and mixtures thereof. It is preferred that the alcohol is selected from $C_3$-$C_6$ alkanols, and in certain embodiments, the molar average carbon number of the alkanols is $C_3$-$C_6$. It has been found that within this range the copolymer has sufficient miscibility with the epoxy resin component and it allows for formulation of a UVi structural bonding adhesive with a useful overall balance of adhesive properties, including overlap shear.

The carbon number molar average may be calculated by summing the number of moles of each alkanol ($C_{1-8}$ alkanols) multiplied by the carbon number of each alkanol, and dividing the result by the total number of moles of alkanols:

$\Sigma_{\alpha-\omega}$[(Moles of alkanol)×(#carbon atoms for alkanol)]/#moles of alkanols $\alpha$ to $\omega$.

In addition, the copolymer may contain a cationically reactive monomer, i.e. a (meth)acrylate monomer having a cationically reactive functional group. Examples of such monomers include, for example, glycidyl acrylate, glycidyl methacrylate, and alkoxysilylalkyl (meth)acrylates, such as trimethoxysilylpropyl acrylate. In some preferred embodiment the functional (meth)acrylate copolymer further comprises cationically reactive monomer units of the monomer units of the formula:

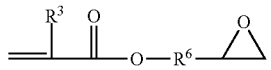

wherein:
$R^6$ is $C_1$-$C_{10}$ alkylene;
$R^3$ is —H or $C_1$-$C_4$ alkyl,

The cationically reactive monomer may be present in amounts of 0 to 10 wt. %, preferably 1 to 5 wt. %, relative to the sum of all free-radically polymerizable monomers.

Optionally a multifunctional (meth)acrylate may be incorporated into the blend of polyinenzable monomers to crosslink the copolymer and build cohesive strength. Examples of useful multifunctional (meth)acrylates include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition. Typically, the multifunctional (meth)acrylate is present in amounts up to 10 parts, preferably 0.1 to 100 parts, based 100 parts by weight of remaining free-radically polymerizable monofunctional monomers.

For stability of the polymerizable composition, the copolymer contains essentially no acid functional monomers, whose presence would initiate polymerization of the epoxy resin prior to UV curing. Furthermore, it is preferred that the copolymer not contain any acrylic monomers having moieties sufficiently basic so as to inhibit cationic cure of the adhesive composition, such as amide, lactam, urea, urethane, carboxylate, thiolate, sulfate, phosphate, and phosphine groups, and the like. For the same reason, it is preferred that the copolymer not contain any amine-functional monomers.

The functional (meth)acrylate copolymer generally comprises polymerized monomer units of.
a) 25-60 wt. %, preferably >45 to 55 wt. %, of hydroxyl-functional or ether-functional (meth)acrylate
b) 40-75 wt. %, preferably 45-55 wt. %, of $C_1$-$C_8$, preferably $C_3$-$C_6$ alkyl (meth)acrylate ester monomers;
c) 0 to 10 wt. %, preferably 1 to 5 wt. % of cationically reactive functional monomers;
d) 0 to 10 wt. %, preferably 1 to 5 wt. % of a multifunctional (meth)acrylate; wherein the sum of a)-c) is 100 wt. %.

The adhesive compositions comprise one or more functional (meth)acrylate copolymers in an amount, which varies depending on the desired properties of the adhesive. Desirably, the adhesive composition comprises one or more functional (meth)acrylate copolymers in an amount of from 15 to 65, preferably 15 to 50 parts, more preferably 25-35 parts by weight, based on the 100 parts total weight of the monomers/copolymers in the adhesive composition.

The adhesive comprises one or more epoxy resins. The epoxy resins or epoxides that are useful in the composition of the present disclosure may be any organic compound having at least one oxirane ring that is polymerizable by ring opening, i.e., an average epoxy functionality greater than one, and preferably at least two. The epoxides can be monomeric or polymeric, and aliphatic, cycloaliphatic, heterocyclic, aromatic, hydrogenated, or mixtures thereof. Preferred epoxides contain more than 1.5 epoxy group per molecule and preferably at least 2 epoxy groups per molecule. The useful materials typically have a weight average molecular weight of about 150 to about 10,000, and more typically of about 180 to about 1,000. The molecular weight of the epoxy resin is usually selected to provide the desired properties of the cured adhesive. Suitable epoxy resins include linear polymeric epoxides having terminal epoxy groups (e.g., a diglycidyl ether of a polyoxyalkylene glycol), polymeric epoxides having skeletal epoxy groups (e.g., polybutadiene poly epoxy), and polymeric epoxides having pendant epoxy groups (e.g., a glycidyl methacrylate polymer or copolymer), and mixtures thereof. The epoxide-containing materials include compounds having the general formula:

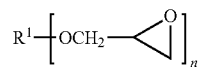

where $R^1$ is an alkyl, alkyl ether, or aryl, and n is 1 to 6.

These epoxy resins include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenvl, p,p'-dihydroxyphenyl sulfone, p,p'-dihydroxybenzophenone, 2,2'-dihydroxy-1,1-dinaphthylmethane, and the 2,2', 2,3',2,4' 3,3', 3,4', and 4,4' isomers of dihydroxydiphenylmethane, dihydroxydiphenvldinmethylmethane, diihydroxydiphenylethylmethylmethane, dihydroxydiphenylmethylpropylmethane, dihydroxydiphenylethvlphenylmethane, dihydroxydiphenylpropylphenylmethane, dihydroxydiphenylbutylphenvlmethane, dihydroxydiphenyltolylethane, dihydroxydiphenyitoiyllmethylmethane, dihydroxydiphenyldicyclohexyhmethane, and dihydroxydiphenylcyclohexane.

Also useful are polyhydric phenolic formaldehyde condensation products as well as polyglycidyl ethers that contain as reactive groups only epoxy groups or hydroxy groups. Useful curable epoxy resins are also described in various publications including, for example, "Handbook of Epoxy Resins" by Lee and Nevill, McGraw-Hill Book Co., New York (1967), and Encyclopedia of Polymer Science and Technology, 6, p. 322 (1986).

The choice of the epoxy resin used depends upon the end use for which it is intended. Epoxides with flexibilized backbones may be desired where a greater amount of ductility is needed in the bond line. Materials such as diglycidyl ethers of bisphenol A and diglycidyl ethers of bisphenol F can provide desirable structural adhesive properties that these materials attain upon curing, while hydrogenated versions of these epoxies may be useful for compatibility with substrates having oily surfaces.

Examples of commercially available epoxides useful in the present disclosure include diglycidyl ethers of bisphenol A (e.g., those available under the trade designations EPON 828, EPON 1001, EPON 1004, EPON 2004, and EPONEX 1510 from Momentive Specialty Chemicals, Inc., and those under the trade designations D.E.R. 331, D.E.R. 332, D.E.R. 334, and D.E.N. 439 available from Dow Chemical Co.);

diglycidyl ethers of bisphenol F (e.g., that are available under the trade designation ARALDITE GY 281 available from Huntsman Corporation); silicone resins containing diglycidyl epoxy functionality; flame retardant epoxy resins (e.g., that are available under the trade designation DER 560, a brominated bisphenol type epoxy resin available from Dow Chemical Co.); and 1,4-butanediol diglycidyl ethers.

Epoxy containing compounds having at least one glycidyl ether terminal portion, and preferably, a saturated or unsaturated cyclic backbone may optionally be added to the composition as reactive diluents. Reactive diluents may be added for various purposes such as to aid in processing, e.g., to control the viscosity in the composition as well as during curing, to flexibilize the cured composition, and to compatibilize materials in the composition.

Examples of such diluents include: diglycidyl ether of cyclohexanedimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N, N'N"-tetraglycidyl meta-xylylene diamine, and vegetable oil polyglycidyl ether. Reactive diluents are commercially available under the trade designation HELOXY 107 and CARDURA N10 from Momentive Specialty Chemicals, Inc. The composition may contain a toughening agent to aid in providing the desired overlap shear, peel resistance, and impact strength.

The adhesive composition desirably contains one or more epoxy resins having an epoxy equivalent weight of from about 100 to about 1500. More desirably, the adhesive contains one or more epoxy resins having an epoxy equivalent weight of from about 100 to about 600. Even more desirably, the adhesive contains two or more epoxy resins, wherein at least one epoxy resin has an epoxy equivalent weight of from about 150 to about 250, and at least one epoxy resin has an epoxy equivalent weight of from about 500 to about 600.

The adhesive composition may comprise one or more epoxy resins in an amount, which varies depending on the desired properties of the structural adhesive layer. Desirably, the adhesive composition comprises one or more epoxy resins in an amount of from 25 to 50 parts, preferably 35-45 parts by weight, based on the 100 parts total weight of the monomers/copolymers in the adhesive composition.

The adhesive composition further comprises a lower Mw, liquid (at 25° C.) hydroxy-functional polyether (polyether polyol) in amounts of 5-15 parts, relative to 100 parts total weight of the monomers/copolymers in the adhesive composition.

Examples of this class of a hydroxy-functional polyether compound include, but are not limited to, polyoxyethylene and polyoxypropylene glycols; polyoxyethylene and polyoxypropylene triols and polytetramethylene oxide glycols. The polyoxyalkylene polyols are particularly suitable for altering the curing reaction so that the "open time" of the adhesive composition can be increased. As used herein, the term "open time" is used to mean the period of time after an adhesive composition has been irradiated, during which time a second substrate can be bonded the adhesive composition.

The open time of the adhesive composition is desirably at least 2 minutes after exposure to an energy dose of about 5.2 J/cm$^2$ of actinic radiation. However, if one or both substrates that are being bonded together are translucent for the radiation to which the structural adhesive layer is to be exposed, the open time is of no relevance because in that case the exposure to the radiation can be effected through the translucent substrate after both substrates have been attached to each other by the adhesive. When both substrates of the assembly are opaque, the adhesive will be exposed to actinic radiation prior to attaching the second substrate thereto. In this case, an open time of at least 2 minutes is desirable to allow for suitable workability of the structural adhesive layer.

Commercially available hydroxy-functional poly(alkylenoxy) compounds suitable for use in the present invention include, but are not limited to, the POLYMEG™ series of polytetramethylene oxide glycols (available from Lyondellbasell, Inc., Jackson, Tenn.), the TERATHANE™ series of polytetramethylene oxide glycols (from Invista, Newark. Del.); the POLYTHF™ series of polytetramethylene oxide glycol from BASF Corp. (Charlotte, N.C.); the ARCOL™ and ACCLAIM™ series of polyoxypropylene polyols (from Covestro) and the VORANOL™ series of polyether polyols from Dow Automotive Systems, Auburn Hills, MI.

The adhesive layer optionally contains at least one hydroxyl-functional film-forming polymer having at least one and desirably at least two hydroxyl groups. Further, the terms hydroxyl-functional film-forming polymer does not include the polyether polyols described above, which also contain hydroxyl groups. Desirably, the film-forming polymer are substantially free of other "active hydrogen" containing groups such as amino and mercapto moieties. Further, the film-forming polymer are also desirably substantially free of groups, which may be thermally and/or photolytically unstable so that the compounds will not decompose when exposed to actinic radiation and/or heat during curing.

The hydroxyl-containing film-forming polymer contains two or more primary or secondary aliphatic hydroxyl groups (i.e., the hydroxyl group is bonded directly to a non-aromatic carbon atom). In some embodiments, the hydroxyl-functional film-forming polymer has a hydroxyl number of at least 0.01. It is believed the hydroxyl groups participate in the cationic polymerization with the epoxy resin.

The hydroxyl-functional film-forming polymer may be selected from phenoxy resins, ethylene-vinyl acetate (EVA) copolymers (solid at 25° C.), polycaprolactone polyols, polyester polyols, and polyvinyl acetal resins that are solid at 25° C. The hydroxyl group may be terminally situated, or may be pendent from a polymer or copolymer. One useful class of hydroxyl-containing film-forming polymers is hydroxy-containing phenoxy resins. Particularly desirable phenoxy resins are those that are derived from the polymerization of a di-glycidyl bisphenol compound. Typically, the phenoxy resin has a number average molecular weight of less than 60,000, desirably in the range of about 20,000 to about 30,000. Commercially available phenoxy resins suitable for use in the present invention include, but are not limited to, PAPHEN™ PKHP-200. available from Inchem Corp. (Rock Hill, S.C.) and the SYNFAC™ series of polyoxyalkylated bisphenol A (from Milliken Chemical, Spartanburg, S.C.) such as SYN FAC™ 8009, 773240, 8024, 8027, 8026, 8071 and 8031;

A second useful class of hydroxyl-containing film-forming polymers is ethylene-vinyl acetate (EVA) copolymer resins. EVA resins contain small amounts of free hydroxyl groups, and it is believed that the EVA copolymers are further deacetylated during cationic polymerization.

Suitable ethylene-vinyl acetate copolymer resins include, but are not limited to, thermoplastic ethylene-vinyl acetate copolymer resins containing at least about 28 percent by weight vinyl acetate. In one embodiment of the present invention, the ethylene-vinyl acetate copolymer comprises a thermoplastic copolymer containing at least about 28 percent by weight vinyl acetate, desirably at least about 40 percent by weight vinyl acetate, more desirably at least about 50 percent by weight vinyl acetate, and even more desirably at least about 60 percent by weight vinyl acetate by weight of the copolymer. In a further embodiment of the present invention, the ethylene-vinyl acetate copolymer contains an amount of vinyl acetate ranging from about 28 to about 99 weight percent of vinyl acetate, desirably from about 40 to about 90 weight percent of vinyl acetate, more desirably from about 50 to about 90 weight percent of vinyl acetate, and even more desirably from about 60 to about 80 weight percent vinyl acetate in the copolymer.

Examples of commercially available ethylene-vinyl acetate copolymers, which may be used in the present invention include, but are not limited to, the Elvax series, including ELVAX™ 150, 210, 250, 260, and 265 from E. 1. Du Pont de Nemours and Co., Wilmington, Del., the ATEVA™ series from Celanese, Inc., Irving, TX); the LEVAPREN™ 400 from Lanxess Corp., Pittsburgh, Pa. including, LEVAPREN™ 450, 452, and 456 (45 weight percent vinyl acetate); LEVAPREN™ 500 HV (50 weight percent vinyl acetate); LEVAPREN™ 600 I-V (60 weight percent vinyl acetate); LEVAPREN™700 HV (70 weight percent vinyl acetate); and LEVAPREN™ 8479 (80 weight percent vinyl acetate), each from Lanxess Corp.

Additional useful film-forming polymers include the TONE™ of polycaprolactone polyols series available from Dow Chemical, Midland, MI, the CAPA™ series of polycaprolactone polyols from Perstorp Inc., the DESMOPHEN™ series of saturated polyester polyols (available from Covestro, Pittsburgh, Pa.) such as DESMOPHEN™ 631A 75.

One or both of the voided and non-voided layer(s) may comprise one or more hydroxyl-containing film-forming polymers resins in an amount, which varies depending on the desired properties of the structural adhesive layer. Desirably, the adhesive composition comprises one or more hydroxyl-containing film-forming polymer resins in an amount of up to about 25 parts by weight, based on 100 parts total weight of the monomers/copolymers in the adhesive composition. More desirably, the adhesive composition comprises one or more film-forming polymers resins in an amount of from about 10 to about 25 parts by weight, based on 100 parts total weight of the monomers/copolymers in the adhesive composition. Even more desirably, the structural adhesive layer of the structural bonding tape of the present invention comprises one or more film-forming polymer resins in an amount of 15 to about 20 parts by weight, based on 100 parts total weight of the monomers/copolymers in the adhesive composition.

In summary, the curable adhesive composition of the voided or foamed layer comprises:
a. 15 to 65, preferably 15 to 50, parts of a hydroxyl-functional or ether-functional (meth)acrylate copolymer;
b. 25 to 50 parts of an epoxy resin component;
c. 5-15 parts of a polyether polyol;
d. 0 to 25, preferably 10 to 25 parts of a hydroxy-functional film-forming polymer;
wherein the sum of a) to d) is 100 parts by weight; and
e. 0.01 to 5 parts of a cationic photoinitiator, relative to 100 parts of a) to d).

The composition of the voided layers may be the same or different, and may vary within the above ranges. In many embodiments the amount of epoxy resin is greater than the (meth)acrylate copolymer; the weight ratio of epoxy resin to (meth)acrylate polymer is from 1:2 to 5:1, preferably 1:1.1 to 5:1.

The adhesive composition may further comprise up to about 50 parts by weight (relative to 100 parts by weight of a) to d)), desirably, up to about 10 percent, of various additives such as fillers, stabilizers, plasticizers, tackifiers, flow control agents, cure rate retarders, adhesion promoters (for example, silanes and titanates), adjuvants, impact modifiers, thermally conductive particles, electrically conductive particles, and the like, such as silica, glass, clay, talc, pigments, colorants, glass beads, and antioxidants, so as to reduce the cost of the structural adhesive layer composition, adjust viscosity, and/or provide additional reinforcement or modify the thermal conductivity of the adhesive compositions and articles of the present invention so that a more rapid or uniform cure may be achieved.

The present disclosure provides an adhesive article containing at least one frangible (voided or foamed) adhesive layer and optionally at least one non-voided layer. The non-voided layer may comprise the same components as described for the voided layer, within the same compositional ranges, but lacking the expanded microspheres. In some embodiments the disclosure provides a multilayer article comprise the voided layer, at least one non-voided layer in which the non-voided layer may be of different polymer composition.

Suitable non-voided substrates can comprise a single material or a combination of different materials and can be homogeneous or heterogeneous in nature. Useful heterogeneous substrates include coated substrates comprising a coating of a material (for example, a glass or a primer) borne on a physical support (for example, a polymeric film).

Useful substrates include those that comprise wood, glass, minerals (for example, both man-made ceramics such as concrete and naturally-occurring stones such as marble and the like), polymers (for example, polycarbonate, polyester, polyacrylate, and the like), metals (for example, copper, silver, aluminum, iron, chromium, stainless steel, nickel, and the like), metal alloys, metal compounds (for example, metal oxides and the like), leather, parchment, paper, textiles, painted surfaces, and combinations thereof. Preferred substrates include those having siliceous surfaces in either primed or unprimed form. Preferred substrates include glass, minerals, wood, metals, metal alloys, metal compounds, primed polymers, and combinations thereof (more preferably, glass, minerals, metals, metal alloys, metal compounds, primed polymers, and combinations thereof; most preferably, glass, minerals, and combinations thereof).

The composition may be coated onto such substrates at useful thicknesses ranging from 25-500 micrometers or more. Coating can be accomplished by any conventional means such as roller, dip, knife, spray, hotmelt or extrusion coating. Solutions of the curable composition may be used to facilitate coating. Stable thicknesses are necessary to maintain the desired coating thickness prior to curing of the composition to form the crosslinked composition.

In preferred embodiments, the adhesive article comprises two non-voided layers and the frangible voided layer disposed therebetween. As used herein, voided refers to an article that includes a polymer matrix in which the density of the article is less than the density of the polymer matrix alone. Density reduction is desirably achieved in a number of ways, including through creation of gas-filled voids in the matrix (e.g., by means of a blowing agent) or inclusion of polymeric microspheres (e.g., expandable microspheres) or non-polymeric microspheres (e.g., glass microspheres). Any means of initiating voids to produce a void layer will be known collectively as a void-initiating component.

In preferred embodiments the voided adhesive layer comprises microspheres. The microspheres may be polymeric microspheres (including expandable or pre-expanded microspheres) or non-polymeric microspheres (e.g., glass microspheres). An "expandable polymeric microsphere" is a microsphere that includes a polymer shell and a core material in the form of a gas, liquid, or combination thereof that expands upon heating. Expansion of the core material, in turn, causes the shell to expand, at least at the heating temperature. An expandable microsphere is one where the shell can be initially expanded or further expanded without breaking. Some microspheres may have polymer shells that only allow the core material to expand at or near the heating temperature.

The choice of thermoplastic resin for the polymeric shell influences the mechanical properties of the voided composition. Accordingly, the properties of the composition may be adjusted through appropriate choice of microsphere, or by using mixtures of different types of microspheres. For example, acrylonitrile-containing resins are useful where high tensile and cohesive strength are desired, particularly where the acrylonitrile content is at least 50% by weight of the resin, more preferably at least 60% by weight, and even more preferably at least 70% by weight. In general, both tensile and cohesive strength increase with increasing acrylonitrile content. In some cases, it is possible to prepare voided layers having higher tensile and cohesive strength than the polymer matrix alone, even though the void has a lower density than the matrix. This provides the capability of preparing high strength, low density articles.

Examples of suitable thermoplastic resins which may be used as the shell include acrylic and methacrylic acid esters such as polyacrylate; acrylate-acrylonitrile copolymer; and methacrylate-acrylic acid copolymer. Vinylidene chloride-containing polymers such as vinylidene chloride-methacrylate copolymer, vinylidene chloride-acrylonitrile copolymer, acrylonitrile-vinylidene chloride-methacrylonitrile-methyl acrylate copolymer, and acrylonitrile-vinylidene chloride-methacrylonitrile-methyl methacrylate copolymer may also be used, but are not preferred where high strength is desired. In general, where high strength is desired, the microsphere shell preferably has no more than 20% by weight vinylidene chloride, more preferably no more than 15% by weight vinylidene chloride. Even more preferred for high strength applications are microspheres having essentially no vinylidene chloride units.

Examples of suitable polymeric mnicrospheres include those described in U.S. Pat. No. 5,658,969 (Gerace), U.S. Pat. No. 5,342,689 (Melber et al.), U.S. Pat. No. 5,180,752 (Melber et al.), U.S. Pat. No. 5,112,657 (Melber), U.S. Pat. No. 5,011,682 (Melber), U.S. Pat. No. 4,722,943 (Melber), each from Pierce Stevens (Buffalo, N.Y.) incorporated herein by reference. Examples of suitable commercially available expandable polymeric microspheres are those that feature neutral coatings, for example Dualite E035-FR containing an aluminum hydroxide (alumina trihydrate or ATI) coating. Pre-expanded and expandable microspheres are available under the Dualite tradenane from Chase Corp, Westwood, MA. Other examples of commercially available mnicrospheres are those available from Azko-Nobel under the designations "Expancel 007" and "Expancel 031". Depending on the acidity, the following microspheres may also be suitable: "820", "461", "551", "642". In addition, the F80SD, F100D, and Expancel 091 microspheres have essentially no vinylidene chloride units in the shell. In addition, Matsumoto Microsphere @F-DE series expanded acrylonitrile microcapsules containing a silica coating from Matsumoto Yushi Seiyaku Co., Ltd, under the designation "F-80DE" is suitable.

It has been discovered that expanded polymeric microspheres must have a neutral surface to not interfere with the photoacid curing when appreciable amounts of water are present. It has been found that many polymeric microspheres have a basic coating (typically $CaCO_3$) that retards curing of the epoxy when appreciable water is present. It is believed that the water solubilizes a portion of the coating, which reacts with the incipient acid generated by the cationic initiator. The useful polymeric microspheres and their inherent coating have a pH of 6-8, preferably 6.5-7.5 using the test method described herein.

The amount of microspheres incorporated into the adhesive composition is chosen to yield a voided layer having a reduction of at least 10%, more preferably in excess of 20%, as measured by density reduction; [1−the ratio of the density of the voided layer to that of the neat adhesive composition]×100. The microspheres may be added in amounts such that the maximum voided layer density is 50%. Generally, the voided layer has a density of 0.45 to 0.85 g/cm$^3$, preferably 0.6 to 0.85 g/cm$^3$.

The adhesive composition for each layer may be prepared by combining the (meth)acrylate copolymer (or monomer mix) with an epoxy resin, polyether polyol, the optional hydroxy-functional film-forming polymer, optional polyvinyl acetal, and a cationic photoinitiator, and photopolymerizing the mixture by irradiation with actinic radiation, preferably at wavelengths >385 nm. The voided layer will further include microspheres to provide the requisite density reduction and the requisite frangibility.

In some embodiments, the (meth)acrylate copolymer is separately prepared by free radical polymerization of the monomer mixture with a photo- or thermal initiator. The copolymers may be prepared by any conventional free radical polymerization method, including solution, radiation, bulk, dispersion, emulsion, solventless, and suspension processes. The resulting adhesive copolymers may be random or block (co)polymers.

Thermal initiators useful in preparing the (meth)acrylate copolymer are initiators that, on exposure to heat, generate free-radicals which initiate (co)polymerization of the monomer mixture. Suitable water-soluble initiators include those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis (4-cyanopentanoic acid) and its soluble salts (e.g., sodium, potassium). Suitable initiators also include those selected from the group consisting of azo compounds such as VAZO™ 64 (2,2'-azobis(isobutyronitrile)) and VAZO™ 52 (2,2'-azobis(2,4-dimethylpentanenitrile)), both available from E.I du Pont de Nemours Co., peroxides such as benzoyl peroxide and lauroyl peroxide, and mixtures thereof. The preferred oil-soluble thermal initiator is (2,2'-azobis(isobutyronitrile)).

When used, thermal initiators may comprise from about 0.05 to about 1 part by weight, preferably about 0.1 to about 0.5 part by weight based on 100 parts by weight of monomer components in the pressure-sensitive adhesive.

Useful photoinitiators include benzoin ethers such as benzoin methyl ether and benzoin isopropyl ether; substituted acetophenones such as 2, 2-dimethoxyacetophenone, available as Irgacure™ 651 photoinitiator (BASF, Ludwigshafen, Germany), 2,2 dimethoxy-2-phenyl-1-phenylethanone, available as Esacure™ KB-1 photoinitiator (Sartomer Co.; West Chester, PA), and dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. Such photoinitiators preferably are present in an amount of from 0.1 to 1.0 pbw per 100 parts of the monomer mixture. The monomer mixture and the photoinitiator may be irradiated with activating UV radiation to polymerize the monomer component(s).

UV light sources can be of two types: 1) relatively low light intensity sources such as backlights which provide generally 10 mW/cm$^2$ or less (as measured in accordance with procedures approved by the United States National Institute of Standards and Technology as, for example, with a Uvimap™ UM 365 L-S radiometer manufactured by Electronic Instrumentation & Technology, Inc., in Sterling, VA) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$.

One useful class of actinic light sources uses light emitting diodes ("LED"). LED-based UV sources are advantageous because they are capable of generating UV light over a much narrower wavelength range compared with other UV light sources such as black lights and mercury lamps. Such LED sources are commercially available, for example, the AC Series 365 nm or 395 nm LED Curing Systems available from Excelitas Technologies (Waltham, MA).

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 24 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

In some embodiments, acrylic mixtures may be prepared by charging a glass jar with the acrylic monomers and film-forming polymer. The mixture can then be rolled overnight, or mixed using a Netzsch Model 50 Dispersator, until clear and homogeneous. The resulting material may be combined with the other components of the adhesive composition, optionally coated onto a substrate (such as a release liner) and polymerized.

The polymerizations may be conducted in the presence of, or preferably in the absence of, suitable solvents such as ethyl acetate, toluene and tetrahydrofuran which are unreactive with the functional groups of the components of the syrup polymer.

A syrup polymer technique comprises partially polymerizing monomers to produce a syrup polymer comprising the solute (meth)acrylate copolymer and unpolymerized solvent monomers. The syrup polymer composition is polymerized to a useful coating viscosity, which may be combined with the other components of the adhesive composition, optionally coated onto a substrate (such as a tape backing) and further polymerized. Partial polymerization provides a coatable solution of the (meth)acrylate solute copolymer in one or more solvent monomers. It will be understood that if a syrup polymerization method is used, additional free radical initiator is necessary to fully polymerize the solvent monomers after compounding.

In a preferred embodiment, the copolymer is prepared by a syrup polymer technique, and the resulting syrup, comprising a solute copolymer and solvent monomer, is combined with the epoxy resin, the polyether polyol, cationic photoinitiator, and the optional film-forming polymer. The voided layer will include the voiding agent. The copolymer in the composition may be further irradiated to effect polymerization, crosslinking, and increasing viscosity. In this method the free radical photoinitiator should be chosen to effect polymerization at a distinct wavelength than that of the cationic photoinitiator to avoid polymerization of the epoxy component. Generally this syrup technique uses a free radical photoinitiator at a near visible frequency, and then a cationic photoinitiator at a UV frequency.

Solventless polymerization methods, such as the continuous free radical polymerization method described in U.S. Pat. Nos. 4,619,979 and 4,843,134 (Kotnour et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer et al.) may also be utilized to prepare the polymers. Preferably, the first copolymer is prepared by the adiabatic batch polymerization process wherein the total of the absolute value of any energy exchanged to or from the batch during the course of reaction will be less than about 15% of the total energy liberated due to reaction for the corresponding amount of polymerization that has occurred during the time that polymerization has occurred, as described in U.S. Pat. No. 5,637,646 (Ellis), incorporated herein by reference.

Preferably the components are combined and photopolymerized using the methods described in the methods described for polymerizing packaged pre-adhesive compositions described in WO9607522 (Hamer et al.) and in U.S. 5,804,610 (Hamer et al.), incorporated herein by reference.

In the methods of Hamer, the packaging material used to form the reaction vessel or container is preferably made of a material that when combined with the adhesive composition does not substantially adversely affect the desired adhesive characteristics. A hot melt coated adhesive produced from a mixture of the adhesive composition and the packaging material may have improved adhesive properties compared to a hot melt coated adhesive produced from the adhesive composition alone.

In another preferred embodiment, the composition is prepared by combining the monomers of the functional (meth)acrylate copolymer, a free radical initiator, the epoxy resin and polyol, optionally the film-forming polymer, water, the cationic photoinitiator, the microspheres and a polyvinyl acetal polymer, such as polyvinyl butyral. In some embodiments the polyvinyl acetal polymer may be used in place of, or in addition to, the hydroxy-functional film-forming polymer. The use of polyvinyl acetal resins allows one to coat out the monomer mixture without using the syrup technique described supra. Such polymers are of the general formula:

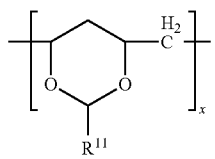

wherein $R^{11}$ is hydrogen, an aryl group or a $C_1$-$C_7$ (cyclo) alkyl group and subscript x is at least 20. The use of such polymers is described in Applicants copending US 2016-0289440 (Janoski et a1), incorporated herein by reference.

When present, the polyvinyl acetal is used in amounts of 0.1 to 6 parts by weight, relative to 100 parts by weight of the curable composition. More particularly, the curable composition may comprise:
  a. 15 to 50 parts of a monomer mixture comprise a hydroxy-functional or ether functional (meth)acrylate monomer, and an alkyl (meth)acrylate monomer;
  b. 25 to 50 parts of an epoxy resin component;
  c. 5-15 parts of a liquid polyether polyol;
  d. optionally up to 25 parts of a hydroxy-functional film-forming polymer;
  e. 0.1 to 2.5 parts water, relative to 100 parts a to d;
  f. 0.01-5 parts cationic photoinitiator, relative to 100 parts a to d;
  g. a sufficient quantity of polymeric microspheres to yield a density reduction of >0%, said microspheres having a neutral surface;
  h. 0.1 to 6 parts by weight of a polyvinyl acetal polymer, relative to 100 parts by weight of a) to d) plus f) and g).
wherein the sum of a) to d) is 100 parts by weight.

The polyvinyl acetal resin utilized in the present invention is obtained, for example, by reacting polyvinyl alcohol with aldehyde, as known in the art.

Polyvinyl alcohol resins are not limited by the production method. For example, those produced by saponifying polyvinyl acetate and the like with alkali, acid, ammonia water, and the like, can be used. Polyvinyl alcohol resins may be either completely saponified or partially saponified. It is preferable to use those having a saponification degree of 80 mol % or more. The polyvinyl alcohol resins may be used singly or in combination of two or more.

Aldehydes used in the production of the polyvinyl acetal resin include formaldehyde (including paraformaldehyde), acetaldehyde (including paracetaldehyde), propionaldehyde, butyraldehyde, n-octylaldehyde, amylaldehyde, hexylaldehyde, heptylaldehyde, 2-ethylhexylaldehyde, cyclohexylaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, β-phenylpropionaldehyde, and the like. These aldehydes may be used singly or in combination of two or more.

With each of the methods, the curable composition comprises 0.1 to 2.5 parts by weight of water, relative to 100 parts by weight of the curable composition. It has been found that the small amount of water alters the cure rate and resultant adhesive properties. Too little and no effect is observed. Too much and the cure is retarded. It is believed the small amount of water increases the available hydronium ion and mobility thereof though the matrix. The water may be introduced by any means in the art, but it is preferred to equilibrate the curable composition under high humidity conditions until the water content is at the desired value.

Examples

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Missouri, or may be synthesized by known methods. Table 1 (below) lists materials used in the examples and their sources.

TABLE 1

Materials List

| DESIGNATION | DESCRIPTION |
| --- | --- |
| ACCLAIM 2200 | Polyether polyol obtained from Covestro, LLC, Leverkusen Germany |
| EPON 1001F | Epoxy resin comprised of diglycidyether of bisphenol A obtained from Momentive Specialty Chemicals, Inc., Columbus, OH |
| EPON 828 | Epoxy resin comprised of diglycidyether of bisphenol A obtained from Momentive Specialty Chemicals, Inc., Columbus, OH |
| CPI 6976 | Triaryl-sulfonium Hexafluoroantimonate, 50 wt % in propylene carbonate obtained from Aceto Corporation, Port Washington NY |
| GPTMS | 3-(Glycidoxypropyl) Trimethoxysilane obtained from United Chemical Technologies, Levittown, PA |
| MOWITAL B60HH | Poly(vinyl butyral) obtained from Kuraray, Tokyo Japan |
| DUALITE E065-135D | Expanded polymer microspheres obtained from Chase Corporation, Westwood, MA |
| DUALITE E035-FR | Expanded polymer microspheres obtained from Chase Corporation, Westwood, MA |
| DUALITE COATING FREE | A small experimental sample free from any coating was obtained from Chase Corporation, Westwood, MA |
| BA | Butyl acrylate obtained from BASF, Ludwigshafen, Germany |
| IRGACURE 651 | Benzyldimethyl ketal photoinitiator obtained from BASF, Ludwigshafen, Germany |

TABLE 1-continued

Materials List

| DESIGNATION | DESCRIPTION |
|---|---|
| IRGACURE 819 | Bis(2,4,6-trimethylbenzoyl)-phenylphosphineoxide photoinitiator, obtained from BASF SE, Ludwigshafen, Germany |
| THFA | Tetrahydrofurfuryl acrylate (V-150) obtained from San Esters, New York, NY |
| HEA | Hydroxyethyl acrylate obtained from BASF, Ludwigshafen, Germany |
| HDDA | Hexanediol diacrylate obtained from Allnex USA Inc., Alpharetta, GA |
| IBOA | Isobornyl acrylate, available from Chempoint, a Univar Company, Calumet City, IL |
| TS720 | Fumed silica |

Test Methods

Method A

Acrylic mixture MI was prepared by charging a glass jar with BA, THFA, and IRGACURE 651 in the amounts shown in Table 2, and stirring until the photoinitiator had dissolved and a homogeneous mixture was obtained. Each mixture was degassed by introducing nitrogen gas into it through a tube inserted through an opening in the jar's cap and bubbling vigorously for at least 5 minutes. While stirring, each mixture was exposed to UVA light until the mixture achieved a viscosity deemed suitable for coating. The light source was an array of LEDs having a peak emission wavelength of 365 nm. Following UV exposure, air was introduced into the jar.

Method B

"Epoxy-polyol premix" was prepared by charging a glass jar with EPON 828 and EPON 1001F in the amounts shown and heating the slurry in a 135° C. oven until a homogenous mixture was obtained. ACCLAIM 2200 was added with stirring and the mixture was allowed to cool to ambient temperature. Immediately prior to use, the mixture was re-heated to ca. 200° F. to decrease viscosity for ease of pouring.

In a glass jar, acrylic mixture M1, GPTMS, HDDA, CPI 6976, epoxy-polyol premix, and IRGACURE 819 were combined in amounts shown in Tables 4 and 6. For mixtures containing a combination of acrylic monomers BA, THFA, IBOA or HEA, the monomers were added in place of M1. TS720 silica or MOWITAL B60HH was then added in the amounts shown in Tables 4 and 6 and resulting mixture was sheared using cowls blade mixing for 1 minute. The GPTMS, HDDA, CPI 6976, epoxy-polyol premix, and IRGACURE 819 was then added in the specified amounts. For specified samples, microspheres were then added. The jar was closed tightly with a foil-lined cap and placed on a jar-roller overnight protected from light.

Method C

Curable layers were then coated between silicone release-coated PET liner using a two-roll coater having a gap setting of 0.005-0.040 inches (127-1016 micrometers) greater than the combined thickness of the two liners, and exposed to UVA energy (1700 mJ/cm$^2$ on each side) using a plurality of bulbs having a peak emission wavelength of 420 nm. The total UVA2 energy was determined using a POWER PUCK II radiometer equipped with low power sensing head (EIT, Inc., Sterling, VA), at a web speed of 12-15 feet per minute (3.7-4.6 meters per minute). The radiometer web speed and energy were then used to calculate the total exposure energy at the web speed used during curing of the acrylic composition.

Method D (FT-NIR Measurement of Epoxy Conversion)

Epoxy conversion (% conversion) was measured Fourier transform near infrared spectroscopy (FT-NIR) (ThermoFisher Nicolet iS10 FT-IR Spectrometer). The test sample was prepared by cutting out a 1"×1" piece of curable tape. The first liner was removed and placed face down in the middle of microscope slide measuring 2×3". The second liner was removed and a microscope slide measuring 1"×3" was placed over the top of the tape to create a sandwich construction. The assembly was exposed to UV-A radiation using an array of LEDs having a peak emission wavelength of 365 nm (CLEARSTONE TECHNOLOGIES, Hopkins, MN). The total UV-A energy (~5-7 J/cm$^2$) was determined using a POWER PUCK II radiometer (EIT, Inc., Sterling, VA). The spectra for % conversion are obtained in an identical manner to those for % water (METHOD F). % Conversion and % water can therefore be determined from the same FT-NIR spectrum. % Conversion quantitation was based on the resolved epoxy near 4530 cm due to the combination of the second epoxy ring overtone and the fundamental C—H stretching. For calibration, a spectrum of curable tape (uncured) and completely cured material were obtained. The completely cured spectrum was subtracted from each sample spectrum. A two point baseline correction was applied to both the epoxy and normalization peaks. To achieve normalization the epoxy peak was ratioed against the total absorbance in the 4590 cm$^{-1}$-4750 cm$^{-1}$ region, which is due to combinations of fundamental C—H stretching and C—C stretching vibrations associated with aromatic groups. Ratioing these signal intensities compensates for any changes in effective pathlength from measurement to measurement (i.e. peak normalization). The aromatic region was chosen over the aliphatic region (4425 cm$^{-1}$-4275 cm$^{-1}$) for use in the normalization because it was more amenable to a simple baseline correction. For quantitation the peak ratio was calibrated by assuming the peak ratio for the uncured sample was associated with 0% conversion.

Method E (Multilayer Method)

To obtain a multilayer article having construction LAYER A—LAYER B—LAYER A, a 180 mm×140 mm portion of a second LAYER A composition was obtained and its first liner was removed. The remaining liner from the LAYER B portion of the laminate was removed and the second LAYER A composition was then laminated to the LAYER B portion of the laminate, by applying hand pressure via use of a plastic spreader. Care was taken to minimize bubbles and voids and align layers parallel to the machine direction.

Method F (FT-NIR Measurement of Moisture)

The moisture content (% water) of the curable tapes was monitored using Fourier transform near infrared spectroscopy (FT-NIR). Samples were placed on glass microscope slides and analyzed in transmission mode. Quantitation was based on contributions from water in the 5310 cm$^{-1}$ to 5040 cm$^{-1}$ region due to the combination of H—O—H stretching and bending vibrations. This water peak was ratioed against the total absorbance in the 4750 cm$^{-1}$-4575 cm$^{-1}$ region, which is associated with fundamental aromatic C—H and ring stretching vibrations. Ratioing these signal intensities compensates for any changes in effective pathlength from measurement to measurement (i.e. peak normalization). The aromatic region was chosen over the aliphatic region (4425 cm$^{-1}$-4275 cm$^{-1}$) for use in the normalization because it was more amenable to a simple baseline correction. A two point baseline correction was applied to both the water and normalization peaks. The peak ratio was calibrated against a set of samples with varying water contents determined by Karl Fischer analysis to enable quantitation.

Method G (Overlap Shear Test)

Adhesion to e-coated steel ('stl') was determined by measuring the overlap shear strength of bonded specimens. Substrate coupons measuring 25 mm×50.8 mm were wiped with a 1:1 (v:v) solution of isopropyl alcohol and water, and were allowed to air dry. Release liner was removed from one side of a 12.7 mm×25 mm portion of the adhesive composition and the composition was applied to one coupon. The second release liner was removed and the composition was exposed to UV-A radiation using an array of LEDs having a peak emission wavelength of 365 nm (CLEARSTONE TECHNOLOGIES, Hopkins, MN). The total UV-A energy (5-7 J/cm$^2$) was determined using a POWER PUCK II radiometer (EIT, Inc., Sterling, VA). A second coupon was applied to the irradiated sample, thus closing the bond. The assembly was wet-out by means of applying a static 6 kg load to the specimen for 6 seconds. Specimens were allowed to cure at ambient temperature and humidity for 24 hours prior to testing.

A dynamic overlap shear test was performed at ambient temperature using an INSTRON TENSILE TESTER MODEL 5581 (Instron Corp., Canton, MA). Test specimens were loaded into the grips and the crosshead was operated at 2.5 mm per minute, loading the specimen to failure. Stress at break was recorded in units of MPa.

Method H (Karl-Fischer)

Sample aliquots of varying sizes (~0.2 g) were sealed in vials and heated to 120° C. in a Metrohm 774 oven processor. Water was transferred from the vial to a Metrohm 851 coulometric Karl Fischer titrator in a stream of predried nitrogen. The titrations were controlled and automatically terminated with Metrohm Tiamo® 2.0 software. Based on moisture content and sample mass, extraction times varied though a minimum extraction time of 300 seconds was employed. The KF unit was configured with Coulomat AG Oven (methanol).

Method I (pH Testing)

Samples were prepared by weighing ~0.10 g (to the nearest 0.1 mg) into a 50 mL centrifuge tube. Approximately 50 mL of Milli-Q deionized water was added and the solutions shaken on a mechanic wrist-action shaker for 24 hours to extract. For the base value, the samples were weighed (~0.15 g) in a 50 mL centrifuge tube. Approximately 50 mL deionized water was added and the solutions were shaken on a mechanical wrist-action shaker for 24 hours to extract. The samples were treated with a known volume of a standardized HCl solution and back-titrated with a standardized NaOH solution. Triplicate blanks were prepared and analyzed alongside the samples. The alkalinity was defined by the equations:

$$\text{Alkalinity (meq/g)} = \frac{Vol_{HCl} * N_{HCl} - Vol_{NaOH} * N_{NaOH,titration}}{g_{sample}} * 1000$$

where Vol$_{HCl}$ and N$_{HCl}$ are the volume and normality of HCl added to the extracts and Vol$_{NaON}$ and N$_{NaOH}$ are the volume and normality of the NaOH titrant. The pH of the microsphere extracts was measured using a low ionic strength electrode prior to titration.

Examples

The acrylic mixture (M1) listed in Table 2 was prepared for use in compounding experiments. Acrylic mixture MI was prepared according METHOD A.

TABLE 2

Composition of acrylic mixture prepared according to METHOD A.

| ACRYLIC MIXTURE | M1, parts |
|---|---|
| BA | 50 |
| THFA | 50 |
| IRGACURE 651 | 0.04 |

Acrylic mixture MI was used to prepare voided layers (as listed in Table 4) and non-voided layers (as listed in Table 6). Voided and non-voided layers were compounded and coated according to METHODS B and C, respectively.

The microspheres were evaluated for extractable base and overall acid-base properties according to METHOD 1, The pH was obtained by vortexing a small amount of spheres (~0.5 g) in water (~2 mL) and testing the aqueous solution with pH paper (0-14).

TABLE 3

Acid-base properties of DUALITE microspheres, obtained according to METHOD I.

| SAMPLE | DESCRIPTION | ALKALINITY, meq/g | pH |
|---|---|---|---|
| DUALITE E065-135D | $CaCO_3$ coating $d = 0.065$ g/cm$^3$ 125-145 μm | 16.7 ± 0.5 | 9-10 |
| DUALITE E035-FR | $Al(OH)_3$ coating $d = 0.035$ g/cm$^3$ 70-100 μm | 0.06 ± 0.01 | 5-6 |
| DUALITE MICROSPHERES (COATING FREE) | no coating $d = 0.015$ g/cm$^3$ 125 μm | <0.001 | 7 |

TABLE 4

Composition of voided layers; compounded and coated according to Method B and Method C, Respectively

| LAYER | C1 | C2 | C3 | C4 | C5 | C6 | C7 | C8 | C9 | C10 | C11 | C12 | C13 | C14 | CE1 | CE2 | CE3 | CE4 |
|---|---|---|---|---|---|---|---|---|---|---|---|---|---|---|---|---|---|---|
| Caliper, mm | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| COMPOSITION, parts | | | | | | | | | | | | | | | | | | |
| M1 | | 46.5 | | | | | | | 46.5 | 46.5 | 46.5 | | | | | | 46.5 | |
| BA | 23.2 | | 23.2 | 23.2 | 23.2 | 23.2 | 34.8 | 23.2 | | | | 23.2 | 23.2 | 23.2 | 23.2 | 23.2 | | 23.2 |
| THFA | 23.2 | | 23.2 | 23.2 | 23.2 | | | | | | | 23.2 | 23.2 | 23.2 | 23.2 | 23.2 | | |
| HEA | | | | | | 23.2 | 11.6 | 11.6 | | | | | 23.2 | | | | | 23.2 |
| IBOA | | | | | | | | 11.6 | | | | | | | | | | |
| EPON 828 | 24.6 | 24.6 | 24.6 | 24.6 | 24.6 | 24.6 | 24.6 | 24.6 | 24.6 | 24.6 | 24.6 | 24.6 | 24.6 | 24.6 | 24.6 | 24.6 | 24.6 | 24.6 |
| EPON 1001F | 12.6 | 12.6 | 12.6 | 12.6 | 12.6 | 12.6 | 12.6 | 12.6 | 12.6 | 12.6 | 12.6 | 12.6 | 12.6 | 12.6 | 12.6 | 12.6 | 12.6 | 12.6 |
| ACCLAIM 2200 | 9.3 | 9.3 | 9.3 | 9.3 | 9.3 | 9.3 | 9.3 | 9.3 | 9.3 | 9.3 | 9.3 | 9.3 | 9.3 | 9.3 | 9.3 | 9.3 | 9.3 | 9.3 |
| MOWITAL B60HH | 5 | 5 | 5 | 5 | 5 | | | | | | | 5 | | 5 | 5 | | | |
| SILICA TS720 | | | | | | 4 | 4 | 4 | | | | 4 | | 4 | | | | 4 |
| DUALITE E065-135D | | | | | | | | | | | | | | | | 2.5 | 2.5 | 2.5 |
| DUALITE E035-FR | 1.4 | 1.4 | 0.5 | 2.5 | 3.5 | 1.4 | 1.4 | 1.4 | | | | | | 1.4 | 0 | | | |
| DUALITE COATING FREE | | | | | | | | | 0.35 | 0.65 | 0.95 | 0.65 | 0.65 | | | | | |
| GPTMS | 1 | 1 | 1 | 1 | 1 | 1 | 1 | 1 | 1 | 1 | 1 | 1 | 1 | 1 | 1 | 1 | 1 | 1 |
| CPI 6976 | 3 | 3 | 3 | 3 | 3 | 3 | 3 | 3 | 3 | 3 | 3 | 3 | 3 | 3 | 3 | 3 | 3 | 3 |
| HDDA | 0.24 | 0.24 | 0.24 | 0.24 | 0.24 | 0.24 | 0.24 | 0.24 | 0.24 | 0.24 | 0.24 | 0.24 | 0.24 | 0.24 | 0.24 | 0.24 | 0.24 | 0.24 |
| IRGACURE 819 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |

The curable voided layers were evaluated for humidity robustness by preconditioning them in constant humidity chambers. The moisture content was monitored according to METHOD F. The layers were considered equilibrated when the water content remained constant (10 to 14 days). The tapes were then evaluated for epoxy conversion according to METHOD D.

TABLE 5

Epoxy conversion for curable voided tapes preconditioned in various humidified environments.

| | RELATIVE HUMIDITY | | | | |
|---|---|---|---|---|---|
| SAMPLE | 10% | 45% | 60% | 75% | 100% |
| C1 | F | F | F | F | F |
| C2 | F | F | — | F | F |
| C3 | F | F | — | F | F |
| C4 | F | F | — | F | F |
| C5 | F | F | — | F | F |
| C6 | F | F | — | F | F |
| C7 | F | F | — | F | F |
| C8 | F | F | — | F | F |
| C9 | F | F | — | F | F |
| C10 | F | F | — | F | F |
| C11 | F | F | — | F | F |
| C12 | F | F | — | F | F |

TABLE 5-continued

Epoxy conversion for curable voided tapes preconditioned in various humidified environments.

| SAMPLE | RELATIVE HUMIDITY | | | | |
|---|---|---|---|---|---|
| | 10% | 45% | 60% | 75% | 100% |
| C13 | F | F | — | F | F |
| C14 | F | F | — | F | F |
| CE1 | F | F | — | F | F |
| CE2 | F | F | N | N | N |
| CE3 | F | N | N | N | N |
| CE4 | F | F | N | N | N |

F = Full Cure;
N = No Cure;
"—" = Not Tested

TABLE 6

Composition of non-voided layers; compounded and coated according to METHOD B and METHOD C, respectively.

| LAYER | S1 | S2 | S3 | S4 |
|---|---|---|---|---|
| Caliper, mm | 0.13 | 0.13 | 0.13 | 0.13 |
| COMPOSITION, parts | | | | |
| M1 | 37.7 | | | |
| TS720 SILICA | | 4 | 4 | 4 |
| BA | | 18 | 27 | 18 |
| HEA | | 18 | 9 | 9 |
| IBOA | | | | 9 |
| EPON 828 | 30.6 | 29.6 | 29.6 | 29.6 |
| EPON 1001F | 15.6 | 15.0 | 15.0 | 15.0 |
| ACCLAIM 2200 | 11.6 | 11.2 | 11.2 | 11.2 |
| GPTMS | 1 | 1 | 1 | 1 |
| CPI 6976 | 3 | 3 | 3 | 3 |
| HDDA | 0.2 | 0.2 | 0.2 | 0.2 |
| IRGACURE 819 | 0.3 | 0.3 | 0.3 | 0.3 |

Multilayer constructions were prepared with the voided layer between two non-voided layers according to METHOD E and shown in Table 7.

TABLE 7

Examples of multilayer constructions with three layers (Layer A-Layer B-Layer A).

| CONSTRUCTION | EX1 | EX2 | EX3 | EX4 | EX5 | EX6 | EX7 | CE5 | CE6 |
|---|---|---|---|---|---|---|---|---|---|
| Layer A | S1 | S1 | S1 | S2 | S3 | S4 | S1 | S1 | S1 |
| Layer B | C1 | C2 | C4 | C6 | C7 | C8 | C10 | CE1 | CE2 |
| Layer A | S1 | S1 | S1 | S2 | S3 | S4 | S1 | S1 | S1 |

The peak area of equilibrated water was measured according to METHOD F and shown in Table 8.

TABLE 8

Water content of preconditioned samples at specified relative humidity.

| SAMPLE | PRECONDITIONED RELATIVE HUMIDITY | | | |
|---|---|---|---|---|
| | 10% RH | 45% RH | 75% RH | 100% RH |
| EX1 | 0.24 | 0.90 | 1.78 | 2.70 |
| EX2 | 0.46 | 0.85 | 1.42 | 1.53 |
| EX3 | 0.30 | 0.92 | 1.82 | 2.69 |
| EX4 | 1.10 | 1.58 | 1.78 | 2.12 |
| EX5 | 0.68 | 1.03 | 1.47 | 1.53 |
| EX6 | 0.78 | 1.04 | 1.31 | 1.51 |
| EX7 | 0.40 | 0.77 | 1.24 | 1.77 |

TABLE 8-continued

Water content of preconditioned samples at specified relative humidity.

| SAMPLE | PRECONDITIONED RELATIVE HUMIDITY | | | |
|---|---|---|---|---|
| | 10% RH | 45% RH | 75% RH | 100% RH |
| CE5 | 0.37 | 0.74 | 0.94 | 1.12 |
| CE6 | 0.19 | 0.98 | — | — |

"—" = Not Tested

The adhesive properties were measured by the overlap shear test according to METHOD G and shown in Table 9.

TABLE 9

Overlap shear performance for preconditioned curable tapes.*

| SAMPLE | PRECONDITIONED RELATIVE HUMIDITY | | | | | |
|---|---|---|---|---|---|---|
| | 10% RH | 33% RH | 45% RH | 60% RH | 75% RH | 100% RH |
| EX1 | 8; M | 9; M | 8; C | 6; C | 5; C | 3; C |
| EX2 | 8; C | — | 7; C | — | 5; C | 4; C |
| EX3 | 6; M | 6; M | 6; M | 5; C | 4; C | 2; I |
| EX4 | 7; C | — | 4; C | — | 3; C | 3; M |
| EX5 | 5; C | — | 4; C | — | 4; C | 1; M |
| EX6 | 9; C | — | 7; C | — | 5; C | 4; C |
| EX7 | 6; C | — | 6; C | — | 5; C | 4; C |
| CE5 | 19; A | — | 22; A | — | 15; A | 12; A |
| CE6 | 8; A | 8; C | 4; I, P | U | U | U |

*Values are in MPa followed by adhesive bond failure mode;
"—" = Not Tested, S = Substrate Failure, C = Cohesive, A = Adhesive, M = Mixed Cohesive/Adhesive, I = Interlayer Adhesive Failure, U = Uncured, P = Partial Cure

TABLE 10

Water content of selected samples as analyzed by Karl-Fischer (METHOD H).

| SAMPLE | EX1 |
|---|---|
| Equilibrated Relative Humidity | |
| 10% RH | 0.080 wt % |
| 33% RH | 0.316 wt % |
| 45% RH | 0.339 wt % |
| 60% RH | 0.507 wt % |
| 75% RH | 0.932 wt % |
| 85% RH | 0.937 wt % |
| 100% RH | 1.575 wt % |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable voided composition comprising:
   a. 15 to 50 parts of a hydroxy-functional or ether functional (meth)acrylate copolymer or syrup thereof,
   b. 25 to 50 parts of an epoxy resin component;
   c. 5-15 parts of a liquid polyether polyol;
   d. optionally up to 25 parts of a hydroxy-functional film-forming polymer;
   e. 0.1 to 2.5 parts water, relative to 100 parts a to d;
   f. 0.01-5 parts cationic photoinitiator, relative to 100 parts a to d;
   g. optionally a polyvinyl acetal polymer,
   h. a sufficient quantity of polymeric microspheres to yield a density reduction of >10% in the curable voided composition after curing, said microspheres having a neutral surface;
   i. optionally a multifunctional (meth)acrylate; and
   j. optionally a radical photoinitiator;
   wherein the sum of a) to d) is 100 parts by weight.

2. The curable voided composition of claim 1 wherein the hydroxy-functional or ether functional (meth)acrylate copolymer comprises monomer units of the formula:
   where
   $R^3$ is —H or $C_1$-$C_4$ alkyl; and
   $R^4$ is an aryl or a linear or branched $C_2$-$C_{10}$ alkylene, and
   $R^5$ is a H and or aryl or a linear or branched $C_1$-$C_4$ alkyl; and
   $R^4$ and $R^5$ may be taken together to form a cyclic ether, and the sum of the carbon atoms of the $R^4$ and $R^5$ groups is from 3 to 10.

3. The curable voided composition of claim 1 wherein the hydroxy-functional or ether functional (meth)acrylate copolymer comprises monomer units of the formula:
   wherein
   $R^3$ is —H or $C_1$-$C_4$ alkyl; and
   $R^6$ is a linear or branched $C_1$-$C_{10}$ alkylene,
   $R^8$ is a $C_2$-$C_{10}$ alkylene.

4. The curable voided composition of claim 1 wherein the hydroxy-functional or ether functional (meth)acrylate copolymer further comprises monomer units of the formula:
   wherein:
   $R^6$ is $C_1$-$C_{10}$ alkylene;
   $R^3$ is —H or $C_1$-$C_4$ alkyl.

5. The curable voided composition of claim 1 wherein the (meth)acrylate copolymer comprises tetrahydrofurfuryl acrylate monomer units.

6. The hydroxy-functional or ether functional (meth)acrylate copolymer of claim 1 comprising:
   a) 25-60 wt. %, of hydroxy-functional or ether functional (meth)acrylate monomer;
   b) 40-75 wt. % of $C_1$-$C_8$ alkyl (meth)acrylate ester monomer;
   c) 0 to 10 wt. % of a multifunctional (meth)acrylate, relative to 100 parts of a) and b).

7. The curable voided composition of claim 1 wherein the composition comprises:
   a. 25 to 35 parts of the hydroxy-functional or ether functional (meth)acrylate copolymer;
   b. 25 to 50 parts of the epoxy resin component;
   c. 5-15 parts of the polyether polyol;
   d. 0 to 25 parts of the hydroxy-functional film-forming polymer;
   wherein the sum of a) to d) is 100 parts by weight; and
   f. 0.1 to 5 parts of the cationic photoinitiator, relative to 100 parts of a) to d).

8. The curable voided composition of claim 1, wherein the weight ratio of component b) to component a) is from 1:2 to 5:1.

9. The curable voided composition of claim 1, wherein the hydroxy-functional or ether functional (meth)acrylate copolymer comprises cationically reactive monomers in amounts of 0.1 to 5 wt. %.

10. The curable voided composition of claim 1, where the film forming polymer is selected from phenoxy resins, ethylene-vinyl acetate (EVA) copolymers, and polyester polyols.

11. The curable voided composition of claim 1, wherein the cationic photoinitiator is a sulfonium or iodonium salt.

12. The curable voided composition of claim 1, wherein the epoxy resin comprises two or more epoxy resins, wherein at least one epoxy resin has an epoxy equivalent weight of from about 150 to about 250, and at least one epoxy resin has an epoxy equivalent weight of from about 500 to about 600.

13. The curable voided composition of claim 1, wherein the hydroxy-functional or ether functional (meth)acrylate copolymer has no acid functional monomer units.

14. The curable voided composition of claim 1, wherein the hydroxy-functional or ether functional (meth)acrylate copolymer is a tetrahydrofurfuryl acrylate copolymer.

15. The curable composition of claim 1 comprising 0.1 to 6 parts by weight of a polyvinyl acetal polymer of the formula:
   wherein $R^{11}$ is hydrogen, an aryl group or a $C_1$-$C_7$ (cyclo)alkyl group and subscript x is at least 20.

16. The multilayer article of claim 15 wherein the non-voided layer is a curable adhesive layer.

17. A multilayer article comprising a void layer formed from the curable voided composition of claim 1 and at least one non-voided layer.

18. A curable voided composition comprising:
   a. 15 to 50 parts of a monomer mixture comprising a hydroxy-functional or ether functional (meth)acrylate monomer, and an alkyl (meth)acrylate monomer;
   b. 25 to 50 parts of an epoxy resin component;
   c. 5-15 parts of a liquid polyether polyol;
   d. optionally up to 25 parts of a hydroxy-functional film-forming polymer;
   e. 0.1 to 2.5 parts water, relative to 100 parts a) to d);
   f. 0.01-5 parts cationic photoinitiator, relative to 100 parts a) to d);
   g. a sufficient quantity of polymeric microspheres to yield a density reduction of >10% in the curable voided composition after curing, said microspheres having a neutral surface;
   h. optionally 0.1 to 6 parts by weight of a polyvinyl acetal polymer, relative to 100 parts by weight of a) to d)
   wherein the sum of a) to d) is 100 parts by weight.

* * * * *

UNITED STATES PATENT AND TRADEMARK OFFICE
CERTIFICATE OF CORRECTION

PATENT NO. : 11,976,148 B2  
APPLICATION NO. : 17/059739  
DATED : May 7, 2024  
INVENTOR(S) : Kelly Anne Volp et al.

Page 1 of 1

It is certified that error appears in the above-identified patent and that said Letters Patent is hereby corrected as shown below:

In the Claims

Column 25  
Line 37, In Claim 2, delete "H and or aryl" and insert -- H or aryl --, therefor.

Line 44 (approx.), In Claim 3, insert --  -- after "formula:".

Line 51, In Claim 4, insert --  -- after "formula:".

Signed and Sealed this  
Twenty-sixth Day of November, 2024

Katherine Kelly Vidal  
*Director of the United States Patent and Trademark Office*